Patented July 29, 1952

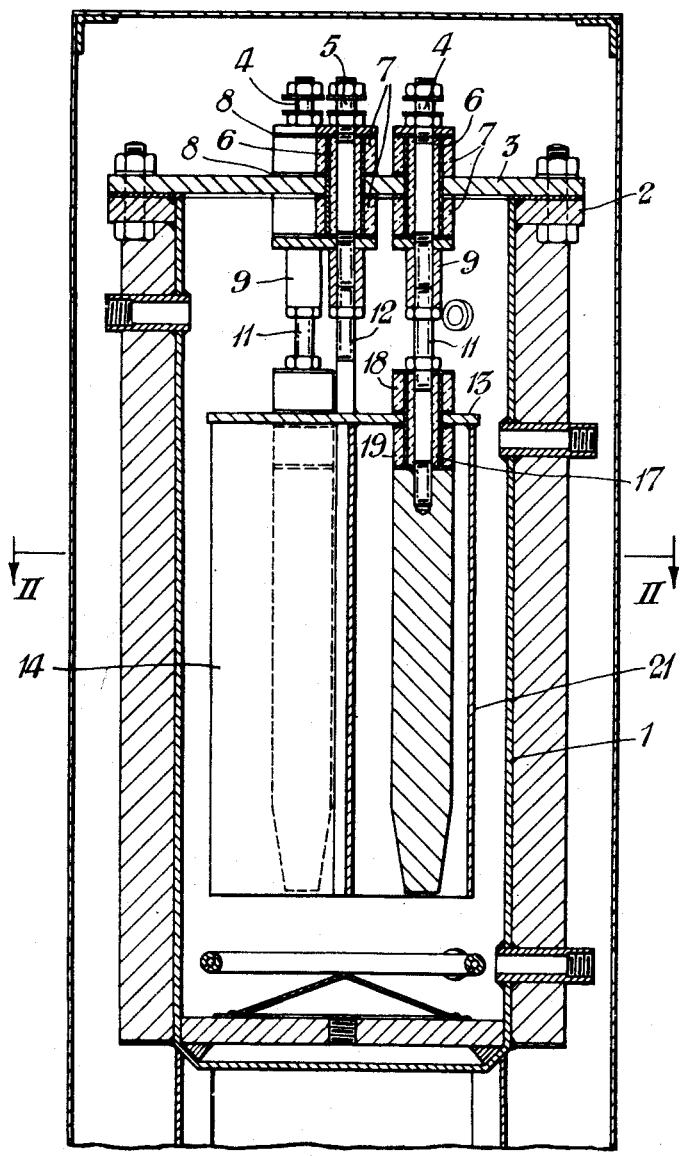

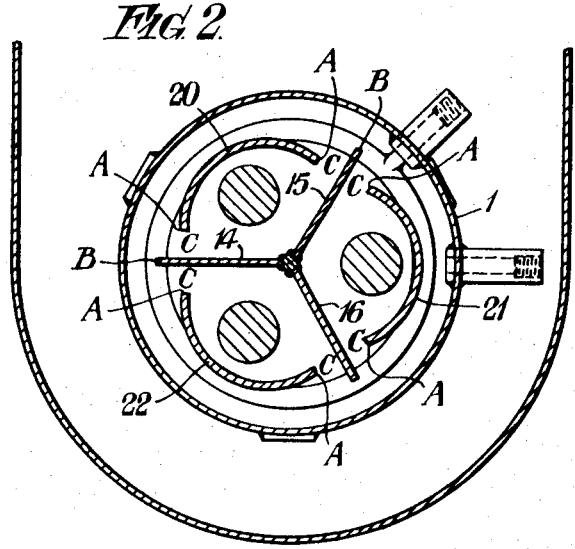
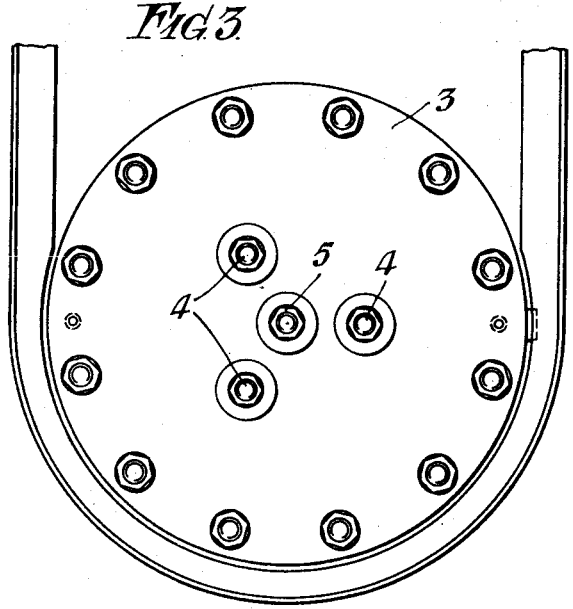

2,605,381

UNITED STATES PATENT OFFICE 2,605,381

ELECTRODE BOILER

Alec Head, Dudley, Worcester, England, assignor to G. W. B. Electric Furnaces Limited, Dudley, England Application February 1, 1950, Serial No. 141,681
In Great Britain February 19, 1949

6 Claims. (Cl. 219—40)

This ivention is concerned with electrode boilers and more especially with the construction and arrangement of the neutral shields for the electrodes of such boilers.

It is normal practice in boilers of the above sort to arrange a tubular neutral shield around each electrode, this prevents leakage of current from the electrodes to the boiler shell as well as interaction between the electrodes themselves.

It is found however that boilers thus fitted give rise to erratic current demand under load, especially after a period of evaporation, when the percentage of solids increases in the boiler so that full rating is developed with only the tips of the electrodes submerged.

It will be appreciated that it is extremely difficult to ascertain the true cause of uneven loading under pressure conditions, but judging from observations made under atmospheric conditions the trouble seems to be mainly due to turbulence in the water between electrode and neutral. This is partly due to the passage of current and partly due to steam formation in the rather narrow space between electrode and neutral.

According to the present invention electrode boilers are provided with neutral shields for the electrodes which allow direct access of the main body of water to be heated or evaporated to the electrodes over the whole or substantially the whole of their effective length, while providing an effective shield to the passage of current between individual electrodes and between the electrodes and the boiler shell.

From another point of view the invention provides a neutral shield assembly for electrode boilers comprising angularly or radially disposed baffle plates and circumferentially disposed shields whereby individual electrodes are effectively shielded from one another and from the boiler shell, while free access of the main body of water is provided between the baffles and the shields to the electrodes through vertical gaps co-extensive or substantially co-extensive with the length of the electrodes.

It is found that the comparatively free access of the main body of water to be evaporated to the electrodes results in more even heating and much less local turbulence in the vicinity of the electrodes so that more even loading is obtained with consequential advantages in the electrical supply circuits.

The above and other parts of the invention are embodied in an electrode boiler for use with a three phase supply which will now be described in some detail by way of example with reference to the accompanying drawings in which:

Fig. 1 is a vertical section through a boiler fitted with baffles according to the invention, Fig. 2 is a horizontal section on the line II—II, Fig. 3 is a top view of the boiler with the casing cover plate removed.

This form of boiler has a lagged cylindrical shell 1 provided with a welded flange 2 at its top to which is bolted a top cover plate 3.

Lead out bolts 4 for connection to the three phases of the supply are fixed through the cover plate 3 at points corresponding to the corners of an equilateral triangle and are equally spaced from a central lead out bolt 5 for connection to the neutral.

Each bolt 4 is fitted with porcelain insulators 6, 7 and suitable steam packing 8 for making joint with the cover plate 3.

To the lower end of each coupling bolt is screwed a coupling box or sleeve 9 for the fixture of an electrode bolt 11 or the neutral shield supporting bolt 12 as the case may be.

Welded to the neutral shield supporting bolt 12 is a horizontally disposed circular plate 13, which extends to within a short distance of the boiler shell 1.

Also welded to the said bolt and to the circular plate are three vertical radially disposed baffle plates 14, 15, 16.

The circular plate 13 is provided with three holes correspondingly arranged to the triangularly spaced holes in the top cover plate 3. Through these holes are fixed the three electrode bolts which have porcelain insulating sleeves 17 and bushes 18, 19 and which are screwed into the coupling boxes 9.

The holes, and thus the electrodes, are spaced equidistantly between adjacent pairs of the baffles 14, 15, 16.

Arcuate, curved or bent shields 20, 21, 22 of equal length to the baffles 14, 15, 16 are welded at their upper edge at or near the periphery of the circular plate 13 and extend vertically downwards. The shape and dimensions of the shields are such that the vertical edges A lie within the circumference of the circular plate 13, whereas the vertical edges B of the radial baffles just reach or project slightly beyond it (see Fig. 2). Further the shields 20, 21, 22 are sufficiently narrow to leave a substantial gap C between their vertical edges and the opposing faces of the baffles 14, 15, 16.

From the above description it should be clear that the three electrodes are effectively shielded from each other by the radial baffles 14, 15, 16 and from the boiler shell by the circumferentially disposed shields 20, 21, 22 while two vertical gaps C co-extensive with the length of the electrodes give access to each between the baffles and the shields from the boiler space outside.

It will be clear to those skilled in the art that modifications of the shape and arrangement of the baffles and shields are possible without departing from the concept of the invention so as to provide neutral shielding for say two or five electrodes.

I claim:

1. An electrode boiler having a neutral shield assembly comprising radially disposed baffle plates joined to each other along a central vertical axis and circumferentially disposed shields whereby individual electrodes are effectively shielded from one another and from the boiler shell while free access of the main body of water to be heated is provided between the baffles and the shields to the electrodes through vertical gaps substantially co-extensive with the effective length of the electrodes.

2. An electrode boiler according to claim 1 in which the shields are of substantially arcuate cross-section.

3. An electrode boiler having a neutral shield assembly comprising radially disposed baffle plates joined to each other along a central vertical axis and circumferentially disposed shields whereby individual electrodes are effectively shielded from one another and from the boiler shell while free access of the main body of water to be heated is provided between the baffles and the shields to the electrodes through vertical gaps substantially co-extensive with the effective length of the electrodes, the baffles and the shields being attached at their upper ends to a circular plate fixed to the neutral connection.

4. An electrode boiler according to claim 3 in which the electrodes are fixed to the circular plate through insulated bushes.

5. An electrode boiler having a neutral shield assembly comprising radially disposed baffle plates joined to each other along a central vertical axis and circumferentially disposed shields whereby individual electrodes are effectively shielded from one another and from the boiler shell while free access of the main body of water to be heated is provided between the baffles and the shields to the electrodes through vertical gaps substantially co-extensive with the effective length of the electrodes, the neutral shield assembly being carried from the boiler cover plate by bolts adapted for connection to the electric current supply.

6. An electrode boiler comprising a shell, a cover plate for the shell, equally spaced bolts for carrying current, a centrally positioned bolt for connection to the neutral of the supply, insulated and steam packed means for carrying the bolts in the cover, electrodes connected to the current carrying bolts by coupling boxes and a neutral shield assembly connected to the centrally disposed bolt by a coupling box, the neutral shield assembly comprising a plate, directly connected to the neutral and connected to the electrodes through insulated bushes, and radially disposed baffles and circumferentially disposed arcuate shields fixed to the plate and defining between them vertical gaps for the access of water to be heated while effectively shielding the electrodes from each other and the boiler shell.

ALEC HEAD.

REFERENCES CITED

The following references are of record in the file of this patent:

UNITED STATES PATENTS

| Number | Name | Date |
|---|---|---|
| 1,476,080 | Kaelin | Dec. 4, 1923 |
| 1,550,224 | Otis et al. | Aug. 18, 1925 |
| 2,050,607 | Hallman | Aug. 11, 1936 |
| 2,451,296 | Mittendorf | Oct. 12, 1948 |